April 3, 1951   S. E. GILMORE   2,547,862
RELIEF VALVE
Filed June 21, 1946   2 Sheets-Sheet 1
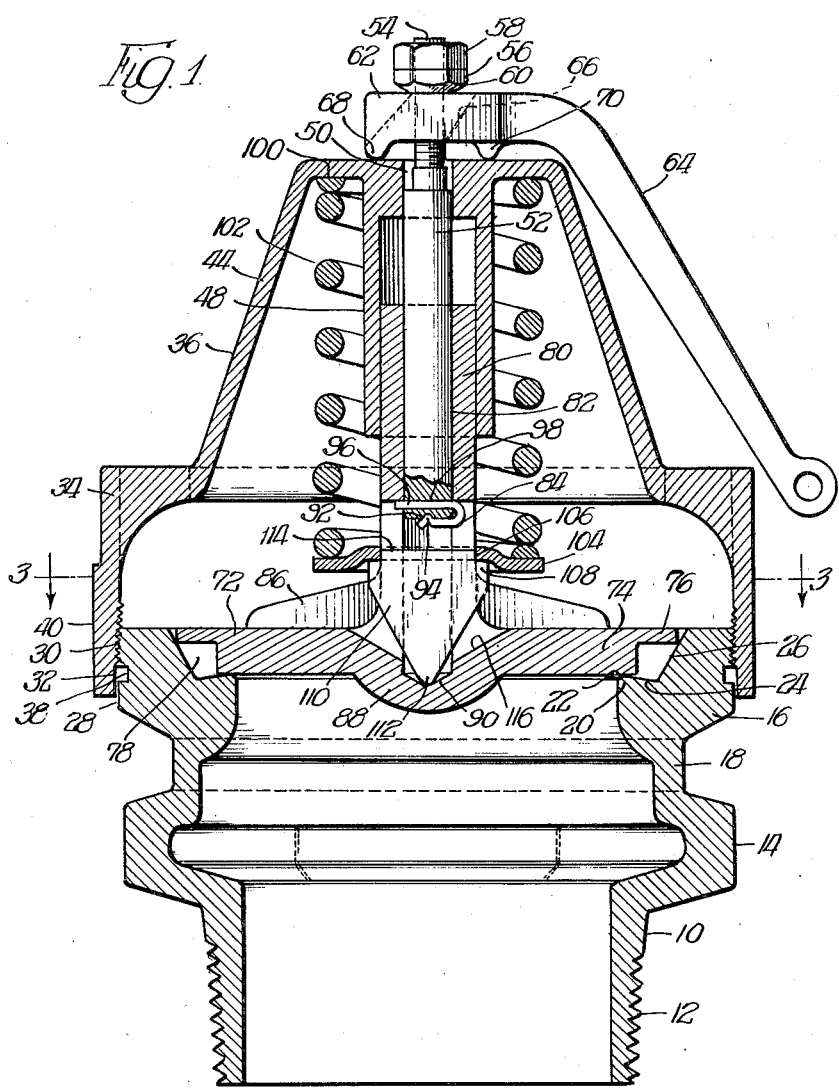
INVENTOR.
Samuel E. Gilmore,
BY

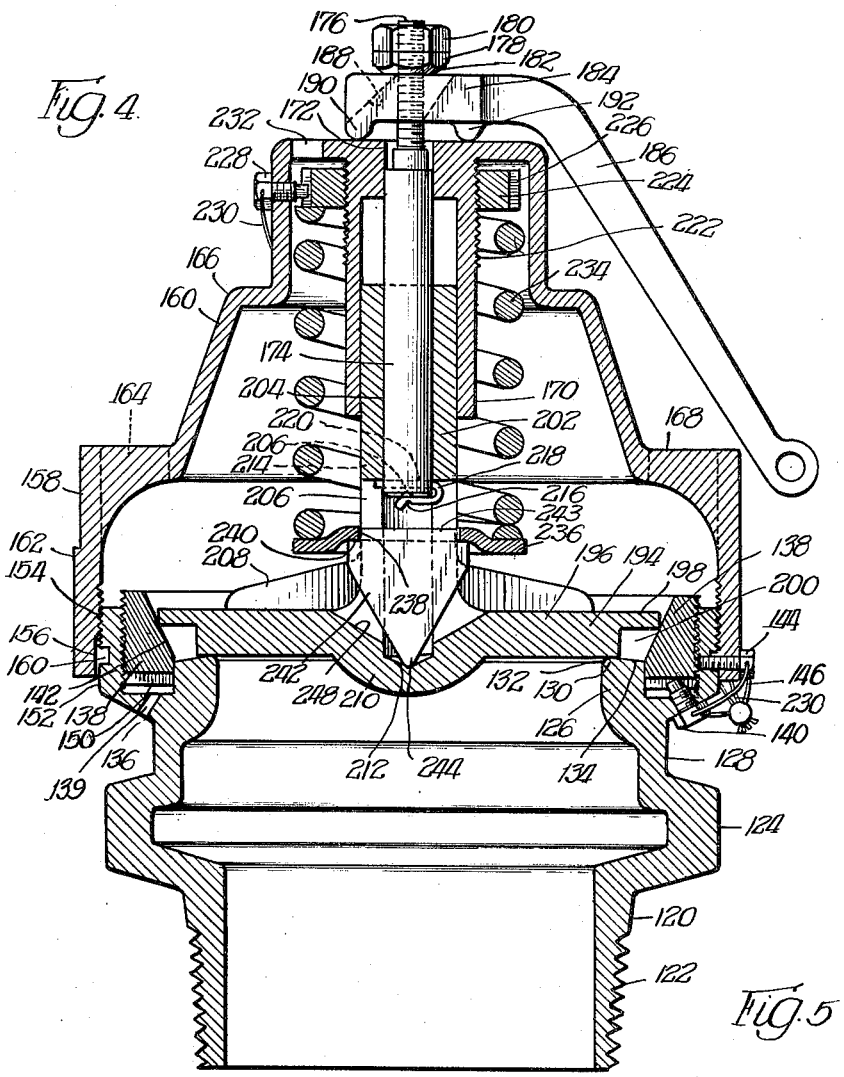
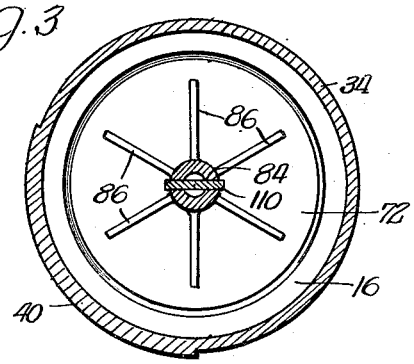
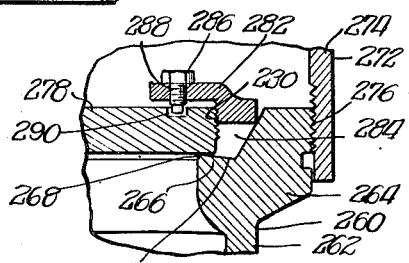
Samuel E. Gilmore,
INVENTOR.

Patented Apr. 3, 1951

2,547,862

UNITED STATES PATENT OFFICE 2,547,862

RELIEF VALVE

Samuel E. Gilmore, Fort Wayne, Ind., assignor to Kunkle Valve Company, Fort Wayne, Ind., a partnership Application June 21, 1946, Serial No. 678,310

10 Claims. (Cl. 137—53)

This invention pertains to valve mechanism, and more particularly to a quick acting safety valve for suddenly relieving pressure after it has reached a predetermined value.

It is an object of this invention to provide a valve mechanism assembly wherein the valve has a high lift and high capacity.

Another object of the invention is to provide a valve mechanism assembly wherein the valve contact with its seat always remains constant whereby no cocking of the valve occurs which would permit leakage or unauthorized operation.

Another object of the invention is to provide a valve mechanism wherein a spring is used with a low spring rate, that is, a lighter spring may be used to hold the desired pressure thereby permitting a wider and quicker valve opening which will cause the pressure to be quickly diminished to the desired pressure when the pressure increases above that which is desired.

Another object of the invention is to provide a valve wherein the exhaust area is substantially equal to the entrance area of the valve body whereby the exhaust capacity is greatly increased.

Another object of the invention is to provide a valve assembly wherein parts of the valve are connected by locking pins which are so arranged that the valve or seat cannot be distorted thereby, and wherein the pins merely arrest relative movements between the parts locked thereby.

Another object of the invention is to provide a valve construction wherein the closure spring and its connection to the valve is so arranged with respect to the valve that the spring pressure is transmitted to the center of the valve disk at all times, thereby preventing cocking of the valve.

Another object of the invention is to provide a valve construction wherein parts are locked by locking pins which are snapped into place wholly within the guide surface or surface of adjacent parts whereby the pin is used merely to connect the valve and manual operating means and does not act as a stop.

Another object of the invention is to provide a valve assembly having a closure spring wherein the parts are so arranged that the spring pressure is transmitted to the valve disk at a point below the seat of the valve whereby the valve is always pulled down evenly to seat.

Another object of the invention is to provide a valve construction comprising a valve disk, guide, stem and lift rod so constructed and arranged that they are not connected in any way to put pressure on the valve whereby the valve is insured of perfect balance on its seat.

Another object of the invention is to provide a valve construction wherein the guide means is so constructed and arranged as to permit low valve construction.

Another object of the invention is to provide a valve construction wherein it is not necessary to use a hood over the lifter inasmuch as the lift rod is not connected to the valve, whereby if any unauthorized weight contacts the lift rod the valve is not rendered inoperative.

Another object of the invention is to provide a valve construction wherein there is provided a huddling chamber to control the valve blow-down, the huddling chamber being adjustable.

Another object of the invention is to provide a valve construction wherein there is provided co-operating guide surfaces on the cap and body in order to hold concentricity between the valve disk and body to insure proper seating of the disk at all times and to insure that there is a balance of pressure at all times in the huddling chamber whereby the valve disk does not tend to cock with respect to the seat.

Another object of the invention is to provide a valve construction comprising a huddling chamber to insure that the valve disk pops quickly upon a rise in pressure above a predetermined pressure whereby the excess pressure is relieved as quickly as possible and does not just bleed off.

Another object of the invention is to provide a valve construction wherein the disk and valve body forms a huddling chamber at all times concentric with the valve guide whereby the opening around the disk always remains constant.

Another object of the invention is to provide a valve construction wherein the disk pops clean without simmering and closes without chatter or simmer within the required blow-down limits.

Another object of the invention is to provide a valve construction wherein the tightening portion of the valve body is separated from the seat by a relatively thin section whereby the seat will not be distorted when the valve is being assembled as with a boiler.

Another object of the invention is to provide a valve assembly wherein there is a narrow contact between the seat and disk so disposed that it is always spaced from the opening in the valve body, that is, cannot be peaned in use to extend into the entrance area of the valve body.

With these and various other objects in view, the invention consists of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a transverse sectional elevation of one form of safety valve embodying the invention;

Figure 2 is a top plan view of the safety valve illustrated in Figure 1, the same being shown on a different scale from Figure 1;

Figure 3 is a sectional plan view of the safety valve illustrated in Figures 1 and 2, made on the scale of Figure 2, the same being taken substantially in the plane as indicated by the line 3—3 of Figure 1;

Figure 4 is a sectional elevation of a modified form of safety valve embodying the invention; and, Figure 5 is a fragmentary sectional elevation through a modified form of valve disk and seat of a safety valve embodying the invention, the disk and seat being adapted to be used with valves such as shown in Figures 1 and 4.

Referring first of all, more particularly, to the valve illustrated in Figures 1 to 3 inclusive, said valve comprises the valve body 10 threaded as at 12 for application to a steam, compressed air or other pressure fluid container such as a boiler, compressed air tank, or the like, said body being provided with the shoulder or hex portion 14 for receiving the jaws of a wrench or other tool for applying said valve to such container. The body is provided with the upper enlarged section 16 integrally connected to the shoulder portion 14 by means of the relatively thin web 18, said relatively thin web preventing distortion of the enlarged portion 16 and the seat 20 provided thereon when the body is being assembled with the container.

The seat 20 is provided with the inner chamfered portion 22 and the outer sloping portion 24, the slope of the portion 24 being slight, such as substantially 1° from horizontal. The chamfer is sufficient so that in use the valve disk will not rear the seat over to overlap into the entrance of the valve body. The portion 24 opens into an outwardly and upwardly sloping portion 26, and the outer surface of enlarged portion 16 is provided with the outer guide surface 28 and the threaded portion 30, the guide surface 28 having complementary cooperation with the guide surface 32 provided on the lower cylindrical ring portion 34 of the cap 36.

Threaded portion 30 is preferably separated from guide portion 28 by a cut-out portion 38, and the ring portion 34 is shown as provided with an arcuate shoulder boss 40 for stamping data, such as ASME data or the like. The cap is provided with arcuate openings 42 of substantially the same area as the exhaust opening in the body 10. The ring 34 is connected to the upper hood 44 of the cap 36 by means of the spaced arms 46 so that the exhaust area formed by openings 42 is thus formed by ring 36, hood 44 and spaced arms 46.

The hood 44 of the cap is provided with the depending cylindrical valve stem guide 48, the upper end of the cap being apertured as at 50 to permit passage of the spindle or lift rod 52, said rod being threaded as at 54 for the reception of adjusting and locking nuts 56 and 58.

The adjusting nut 58 is preferably provided with a rounded surface 60 adapted to engage the upper surface of the cam and securing portion 62 of the lift lever 64. The portion 62 is provided with an angularly extending aperture 66 through which the threaded portion 54 of the lift rod 52 extends, and portion 62 is provided with the spaced cams 68 and 70 permitting rocking movement of the lever 64 to raise the lift rod 52.

Valve 72 comprises the valve disk 74 provided with the outer flange 76, the valve disk being adapted to seat on the valve seat 20 whereby the flange and disk provides a huddling chamber 78 with the seat portion 24 and the sloping portion 26 of the valve body 10.

The valve disk 74 is provided with the upwardly extending stem 80 extending within the guide 48 and being guided thereby, the stem being provided with the passage 82 for the reception of the lift rod 52 which extends downwardly and below the top of slot 84 provided in the stem 80. The slot extends downwardly of the stem to the disk 74 and the stem is cast integrally with the disk 74, the radial arms 86 (Figure 3) being provided to strengthen the disk 74.

The valve disk is formed with the arcuate portion 88 provided with the seat 90, the seat and arcuate portion being so arranged with respect to the disk that the seat is substantially below the seat 20 when the valve is seated or in closed position. The lower end of the lift rod 52 is dimpled as at 92 for the reception of a complementary locking shoulder 94 of the relatively resilient locking pin 96, the body of the pin extending through an aperture 98 provided in the lift rod 52 and the shoulder 94 being snapped into the dimple, it being seen that the locking pin, when in assembled position, is wholly within the outside surface of the stem 80 whereby it can never engage the lower portion of the guide 48.

The upper portion of cap 36 is provided with the spring seat 100 on which the upper end of spring 102 is seated, the lower end of the spring being seated on the spring plate or seat 104. The spring plate 104 is apertured as at 106 to fit over the stem 80, being slightly dished to lockingly seat upon the shoulders 108 of the spring plate support or pressure flint 110 which is received in slot 84 and extends downwardly, seating through its point 112 on the seat 90. The flint is provided with a portion 114 adapted to closely fit the aperture 106 of the seat 104 whereby the flint is positioned. It will be seen that the flint is easily inserted through slot 84 as the valve disk 74 is provided with sloping portions 116 extending from the top part of the valve disk 74 to a point adjacent the seat 90.

Referring now, more particularly, to the construction shown in Figure 4, said valve comprises the valve body 120 threaded as at 122 for connection to a pressure container, said body being provided with the shoulder or hex portion 124 for receiving the jaws of a wrench or other tool for applying the valve to the container.

The body is provided with the upper enlarged section 126 integrally connected to the hex portion 124 by means of the relatively thin web 128, said web preventing distortion of the enlarged portion 126 and the seat 130 provided thereon when the body is being assembled with the container. The seat 130 is similar to seat 20, being provided with the inner chamfered portion 132 and the outer sloping portion 134, the slope of said portion being slight, such as substantially 1° from horizontal. The enlarged portion 126 is provided with the annular recess 136 for reception of the externally threaded ring 138, suitable drains 139 being provided for said recess 136.

The ring or huddling chamber adjusting member 138 is positioned in the enlarged portion 126, which is internally threaded to accommodate the threads of ring 138, by means of the threaded bolt 140, and the threads of said ring 138 and portion 126 are adapted to provide adjusting means for the ring 138. Ring 138 is provided with the upwardly and outwardly sloping surface 142 disposed adjacent surface 134 and, as before pointed out, ring 138 is adapted to be locked in selected position by means of the threaded bolt 140 which is sealed in position with the bolt 144 by means of the seal wire 146. In order to effect the ready adjustment of the ring 138, the base thereof is provided with spaced ridges 150 forming locking indentations which may receive the inner end of bolt 140 to prevent accidental relative movement between ring 138 and portion 126.

The portion 126 is designed with the outer guide surface 152 and the threaded portion 150, the guide surface 152 having complementary cooperation with the guide surface 156 provided on the lower cylindrical ring 158 of the cap 160. Ring 158 is apertured for the reception of bolt 144 which, when sealed, prevents unauthorized removal or moving of the cap 160. Threaded portion 154 is preferably separated from the guide portion 152 by a cut-out portion or slot 160 and the ring portion is provided with an arcuate shoulder 162 similar to shoulder 40, and for the same purposes.

The cap is provided with arcuate openings 164 of substantially the same area as the exhaust opening in the body 120. The ring 158 is connected to the upper hood 166 of the cap 160 by means of the spaced arms 168, so that the exhaust area formed by openings 164 are thus formed by ring 158, hood 166 and spaced arms 168.

The hood 166 is provided with the depending cylindrical valve stem guide 170, the upper end of the cap being apertured as at 172 to permit passage of the spindle or lift rod 174, said rod being threaded as at 176 for the reception of adjusting and locking nuts 178 and 180.

The adjusting nut 178 is similar to nut 56, being preferably provided with the rounded surface 182 adapted to engage the upper surface of the cam and lifting portion 184, the lift lever 186 being similar to lift lever 64. As before, portion 184 is provided with an angularly extending aperture 188 through which the threaded portion 176 of the lift rod 174 extends, and portion 184 is provided with spaced cams 190 and 192 permitting rocking movement of the lever 186 to lift the lift rod 174.

Valve 194 comprises the valve disk 196 provided with the outer flange 198, the valve disk being adapted to seat on the valve seat 130 whereby the flange and disk provides a huddling chamber 200 with portions 134 and 144 of the valve body and member 142.

The valve disk 196 is provided with the upwardly extending stem 202 extending within the guide 170 and being guided thereby, the stem being provided with the passage 204 for the reception of the lift rod 174 which extends downwardly and below the upper end of slot 206 provided in the stem 202. The slot extends downwardly of the stem to the disk 196 and the stem is cast integrally with the disk, radial arms 208, similar to arms 86 being provided to strengthen the disk 196. The valve disk is formed with the arcuate portion 210 provided with the seat 212, the seat and arcuate portion being so arranged with respect to the disk that the seat is substantially below the seat 130 when the valve is seated or in closed position.

The lower end of the lift rod 174 is dimpled as at 214 for the reception of the complementary locking shoulder 216 of a relatively resilient locking pin 218, the body of the pin extending through an aperture 220 provided in the lift rod 174 and the shoulder 216 snapped into the dimple, it being seen that the locking pin when in assembled position is wholly within the outside surface of the stem 202 whereby the pin can never engage the lower portion of the guide 170. The upper portion of the guide 170 is threaded as at 222 for the reception of the adjustable spring seat 224, said spring seat being provided with the spaced lugs 226 forming recesses therebetween so that the seat can be adjusted and locked by means of the inner end of the bolt 228 threaded through the upper portion of the hood 166 and sealed by the wire 230 which may extend to the same seal for wire 148. Adjustment of the seat 224 may be effected through the elongated opening 232 provided in the top of the hood 166.

One end of spring 234 seats on the seat 224, the other end of the spring being seated on the spring plate 236. The spring plate 236 is apertured as at 238 to fit over the stem 202, being slightly dished to lockingly seat on the shoulders 240 of the spring plate support of pressure flint 242 which is received in the slot 84 and extends downwardly, seating through its point 244 on the seat 90. The flint is provided with a portion 243 adapted to closely fit the aperture of the seat 236 whereby the flint is positioned. It will be seen that the flint is easily inserted through slot 246 as the valve disk 196 is provided with the sloping portions 248 extending from the top part of the valve disk to a point adjacent the seat 212.

In the construction illustrated in Figure 5, there is shown a construction of modified form, wherein the huddling chamber may be adjusted in a different manner from that illustrated in Figure 4, it being understood, of course, that the poppet construction illustrated in Figure 5 may be used with either of the constructions illustrated in Figure 1 or 4.

In this construction the valve body 260 is similar to that illustrated in Figure 1 wherein the web 262, similar to web 18, merges into the enlarged portion 264, similar to portion 16, said enlarged portion being provided with the valve seat 266, similar to seat 20, being provided with the chamfered portion 268 and the angular portion 270. The ring portion 272 of the cap 274 is threaded as at 276 to the enlarged portion 264 of the body, and the cap and body are provided with complementary guiding portions similar to portions 30 and 28 (Figure 1). The undersurface of poppet 278 is adapted to seat on the valve seat 266 and is provided on its periphery with the threads 280 to which the threads of the adjustable flange 282 are adapted to engage, thus permitting the adjustable flange to be raised and lowered whereby the huddling chamber 284 is adjusted.

In order to prevent accidental or other rotation between the flange and poppet, the positioning bolt 286 is threaded as at 288 to the adjustable flange and the end of said bolt is adapted to be received in selected spaced apertures 290 disposed circumferentially around the poppet.

It will be seen that with valves of the construction illustrated a quick opening valve is provided and one wherein space is provided for a well designed spring which may be used to hold the desired pressure, thereby permitting a valve of higher lift. The fluid seeking to escape will act on the underside of the valve disk until the spring pressure is substantially balanced whereby the valve disk lifts slightly permitting the fluid flow to be deflected as well as causing a static pressure against the entire disk area, that is, the underside of the disk and the underside of the flange. Thus force is added to the static fluid pressure which causes a quicker, sudden opening of the valve. When the disk is opened to a point where the flow increases, the main forces holding the valve open are those of kinetic energy and a static pressure of the fluid. If it is desired to relieve the pressure manually, it is only necessary to rock the levers, permitting the lift rod to lift the valve through its stem.

It will be noted that the lift lever and lift rod do not move with the poppet when it is opened by the fluid pressure, so that even though there is some interference with the lift lever and lift rod the valve would still be operative. By providing large exhaust areas, that is the exhaust area of the cap being substantially equal to the entrance area, the fluid can readily escape to quickly diminish the fluid pressure within the container to which the valve is attached. By the spring and flint construction the pressure is always centered with respect to the valve, and the valve is guided by the stem and guide so that there is no cocking of the valve, but it always is centered whereby there is insured positive action with no simmering or leak off.

It is to be understood that this application is not to be limited by the exact embodiments of the device shown, which are merely by way of illustration and not limitation, as various and other forms of the device will, of course, be apparent to those skilled in the art without departing from the spirit of the invention or the scope of the claims.

I claim:

1. In valve construction, the combination of a valve body having a lower portion for attachment to an object to be vented, said body having an upper enlarged portion having a valve seat, said seat being chamfered adjacent the valve opening and having a sloping portion extending outwardly from the chamfer, said sloping portion being substantially 1° from horizontal, an upwardly and outwardly sloping portion extending from the first named sloping portion, a valve cap secured to said enlarged portion, said cap having a hood provided with a guide, a valve poppet having a disk adapted to seat on said seat, said disk having a flange extending toward the second named sloping portion and terminating adjacent thereto when said disk is seated on said seat, whereby the periphery of the disk, said flange and the sloping portion of the body form a huddling chamber, a valve stem on said disk extending into said guide, said stem being slotted adjacent the disk, said disk having a seat substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats.

2. In valve construction, the combination of a valve body having a lower portion for attachment to an object to be vented, said body having a valve seat, said seat being chamfered adjacent the valve opening and having a sloping portion extending outwardly from the chamfer, an upwardly and outwardly sloping portion extending from the first named sloping portion, a valve cap secured to said enlarged portion, said cap having a hood provided with a guide, a valve poppet having a disk adapted to seat on said seat, said disk having a flange extending toward the second named sloping portion and terminating adjacent thereto when said disk is seated on said seat, whereby the periphery of the disk, said flange and the sloping portions of the body form a huddling chamber, a valve stem on said disk extending into said guide, said stem being slotted adjacent the disk, said disk having a seat substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats.

3. In valve construction, the combination of a valve body having a lower portion for attachment to an object to be vented, said body having a valve seat, said seat being chamfered adjacent the valve opening and having a sloping portion extending outwardly from the chamfer, an upwardly and outwardly sloping portion extending from the first named sloping portion, a valve cap secured to said enlarged portion, said cap having a hood provided with a guide, a valve poppet having a disk adapted to seat on said seat, said disk having a flange extending toward the second named sloping portion and terminating adjacent thereto when said disk is seated on said seat, whereby the periphery of the disk, said flange and the sloping portions of the body form a huddling chamber, a hollow valve stem on said disk extending into said guide, said stem being slotted adjacent the disk, said disk having a seat substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats, a lift rod extending through said cap and into said hollow valve stem, a connection between said lift rod and valve stem disposed within the stem, said connection being so constructed and arranged as to permit said valve to open without moving said lift rod but movement of the lift rod opening the valve, and a lift lever pivoted to said lift rod and provided with cams engaging said cap on each side of said rod.

4. In valve construction, the combination of a valve body having a lower portion for attachment to an object to be vented, said body having a valve seat, a valve cap secured to said body, said cap having a hood provided with a guide, a valve poppet having a disk adapted to seat on said seat, a valve stem on said disk extending into said guide, said stem being slotted adjacent the disk, said disk having a seat adjacent the slot substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats.

5. In valve construction, the combination of a valve body having a lower portion for attachment to an object to be vented, said body having an upper enlarged portion having a valve seat, said seat being chamfered adjacent the valve opening and having a sloping portion from the chamfer, said sloping portion being substantially 1° from horizontal, an upwardly and outwardly sloping portion extending from the first named sloping portion, a valve cap secured to said enlarged portion, said cap having a hood provided with a guide, a valve poppet having a disk adapted to seat on said seat, said disk having a flange extending toward the second named sloping portion and terminating adjacent thereto when said disk is seated on said seat, whereby the periphery of the disk, said flange and the sloping portions of the body form a huddling chamber, a valve stem on said disk extending into said guide, said stem being slotted adjacent the disk, said disk being provided with a seat below said slot, said slot being substantially below the seat contacting surface of said disk, a pressure flint in said slot having a point contact with the seat on said disk, said flint having spaced supporting shoulders extending outwardly of said stem, a spring seat on said shoulders, a fixed spring seat provided by an integral portion of said cap, and a spring seated on said last named seats.

6. In valve construction, the combination of a valve body having a lower portion for attachment to an object to be vented, said body having a valve seat, a valve cap secured to said body, said cap having a hood provided with a guide, a valve poppet having a disk adapted to seat on said seat, said disk having a flange extending toward the second named sloping portion and terminating adjacent thereto when said disk is seated on said seat, whereby the periphery of the disk, said flange and the sloping portions of the body form a huddling chamber, a valve stem on said disk extending into said guide, said stem being slotted adjacent the disk, said disk being provided with a seat below said slot, said seat being substantially below the seat contacting surface of said disk, a pressure flint in said slot having a point contact with the seat on said disk, said flint having spaced supporting shoulders extending outwardly of said stem, a spring seat on said shoulders, a fixed spring seat provided by an integral portion of said cap, and a spring seated on said last named seats.

7. In valve construction, the combination of a valve body having a lower portion for attachment to an object to be vented, said body having a valve seat, a valve cap secured to said body, said cap having a hood provided with a guide, a valve poppet having a disk adapted to seat on said seat, a valve stem on said disk extending into said guide, said stem being slotted adjacent the disk, said disk being provided with a seat below said slot, said seat being substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats.

8. In valve construction, the combination of a valve body having a lower portion for attachment to an object to be vented, said body having a valve seat, a valve cap secured to said body, said cap having a hood provided with a guide, a valve poppet having a disk adapted to seat on said seat, a hollow valve stem on said disk extending into said guide, said stem being slotted adjacent the disk, said disk being provided with a seat below said slot, said seat being substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats, a lift rod extending through said cap and into said hollow valve stem, a connection between said lift rod and valve stem disposed within the stem, said connection being a lost motion connection as to permit said valve to open without moving said lift rod but movement of the lift rod opening the valve, and a lift lever pivoted to said lift rod and provided with cams engaging said cap on each side of said rod.

9. In valve construction, the combination of a valve body having a lower portion for attachment to an object to be vented, said body having a valve seat, said body having a sloping portion adjacent said seat, a valve cap secured to said body, said cap having a hood provided with a guide, a valve poppet having a disk adapted to seat on said seat, said disk having a flange extending toward the second named sloping portion and terminating adjacent thereto when said disk is seated on said seat, whereby the periphery of the disk, said flange and the sloping portion form a huddling chamber, a hollow valve stem on said disk extending into said guide, said stem being slotted adjacent the disk, said disk being provided with a seat below said slot, said seat being substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats, a lift rod extending through said cap and into said hollow valve stem, a connection between said lift rod and valve stem disposed within the stem, said connection being a lost motion connection as to permit said valve to open without moving said lift rod but movement of the lift rod opening the valve, and a lift lever pivoted to said lift rod and provided with cams engaging said cap on each side of said rod.

10. In valve construction, the combination of a valve body having a lower portion for attachment to an object to be vented, said body having a valve seat, said body having a sloping portion adjacent said seat, a valve cap secured to said body, said cap having a hood provided with a guide, a valve poppet having a disk adapted to seat on said seat, said disk having a flange extending toward the second named sloping portion and terminating adjacent thereto when said disk is seated on said seat, whereby the periphery of the disk, said flange and the sloping portion form a huddling chamber, a valve stem on said disk extending into said guide, said stem being slotted adjacent the disk, said disk being provided with a seat below said slot, said seat being substantially below the seat contacting surface of said disk, a pressure flint in said slot having a point contact with the seat on said disk, said flint having spaced supporting shoulders extending outwardly of said stem, a spring seat on said shoulders, a spring seat on said cap aligned with said last named spring seat, and a spring seated on said last named seats, a lift rod extending through said cap, a lost motion connection between said lift rod and valve stem to permit said valve to open without moving said lift rod, the lift rod being movable to open the valve, and a lift lever pivoted to said lift rod and provided with cams engaging said cap on each side of said rod.

SAMUEL E. GILMORE.

REFERENCES CITED

The following references are of record in the file of this patent:

UNITED STATES PATENTS

| Number | Name | Date |
|---|---|---|
| 395,536 | Ashton | Jan. 1, 1889 |
| 426,516 | Robinson | Apr. 29, 1890 |
| 1,482,233 | Hewitt | Jan. 29, 1924 |
| 1,690,097 | Ackerman | Nov. 6, 1928 |

FOREIGN PATENTS

| Number | Country | Date |
|---|---|---|
| 103,383 | Great Britain | Jan. 25, 1917 |
| 427,984 | Great Britain | May 3, 1935 |